United States Patent Office 3,759,884
Patented Sept. 18, 1973

3,759,884
PROCESS FOR THE POLYMERIZATION OR CO-POLYMERIZATION OF ETHYLENE WITH THE USE OF A CATALYST SUPPORTED BY A CARRIER
Tadaichi Tokuzumi, Otake-shi, Hiroshima-ken, Hiroshi Fujimura, Yamaguchi-ken, and Norio Kashiwa, Hiroshima-ken, Japan, assignors to Mitsui Petrochemical Industries, Ltd., Tokyo, Japan
No Drawing. Filed Nov. 14, 1968, Ser. No. 775,901
Claims priority, application Japan, Sept. 11, 1968, 43/64,936
Int. Cl. C08f 1/56, 3/06
U.S. Cl. 260—88.2 R                          18 Claims

ABSTRACT OF THE DISCLOSURE

In the process for the polymerization or copolymerization of ethylene in an inert solvent in the presence of a catalyst comprising a titanium or vanadium halogen compound chemically bonded onto the surface of inorganic solid particles, and an organoaluminum compound or a dialkyl zinc, the improvement wherein the inorganic solid particles are particles of magnesium hydroxide having an average particle diameter exceeding $1\mu$ but not greater than $70\mu$, and a specific surface area in the range of from 20 to 100 m.$^2$/g.

---

The invention relates to an improvement of the conventional process for the polymerization of ethylene in an inert solvent in the presence of a catalyst comprising a transition metal halogen compound chemically bonded onto the surface of inorganic solid particles, and an organoaluminum compound or a dialkyl zinc. (The polymerization of ethylene referred to herein includes the homopolymerization of ethylene and the copolymerization of ethylene with other comonomer copolymerizable with ethylene such as propylene, butene and styrene.)

More specifically, this invention relates to an improvement of the conventional process for the polymerization of ethylene, wherein as inorganic solid particles there are used
(i) particles of magnesium hydroxide having
(ii) an average particle diameter in the range of from 1 to $70\mu$, preferably from 2 to $60\mu$, especially preferably from 3 to $50\mu$, most preferably from 4 to $30\mu$, and
(iii) a specific surface area (as measured by the nitrogen adsorption method) in the range of from 20 to 100 m.$^2$/g., preferably from 25 to 100 m.$^2$/g., especially preferably from 35 to 80 m.$^2$/g.

With regard to the conventional process, the following proposals have been made. U.S. Pat. 3,166,542 (patented on Jan. 9, 1965) teaches that it is essential to use as the inorganic solid particles finely divided inorganic solids having an average equivalent particle diameter of less than about 1 micron, especially of less than about 0.1 micron, and it claims the use of a finely divided inorganic solid having an average particle diameter of less than about 0.1 micron.

In this proposal, preferable inorganic solids described as metal oxides such as alumina, titania, zirconia, silica, thoria and magnesia; silicates such as chrysotile, actinolite and crocidolite; and aluminates such as corundum and bauxite. With reference to the inorganic solid and the particle diameter thereof, such proposal discloses that the smaller the particle size of the inorganic solid and the larger the quantity of hydroxyl groups on the surface thereof, the greater will be the potential activity and efficiency of the resulting catalyst component producible therefrom.

Belgian Pat. No. 705,220 (patented on Oct. 17, 1967) proposes a similar catalyst system where no specific restriction is given to the particle diameter, and according to this proposal it is preferable to use a solid having an average particle diameter as large as 0.1 mm. ($100\mu$).

In this proposal, preferable solids are cited as the oxides, sulfates nitrates, phosphates, silicates, and mono- and poly-carboxylates of divalent metals such as magnesium and calcium.

According to this proposal, it is essential that the reaction between the solid particles and the transition metal compound should be allowed to occur on the particle surface where the quantity of hydroxyl groups is small.

With reference to the solid particle diameter and the hydroxyl group on the particle surface, the above two proposals teach recognitions contradictory to each other. On the other hand, with reference to usable solids, they, in common, teach a considerable number of overlapping compounds. However, the former proposal is quite silent to hydroxides, particularly magnesium hydroxide and the usability thereof is unobvious from the former proposal, while the latter proposal expresses a negative recognition concerning the use of hydroxides to the effect that they do not exhibit good catalytic activity.

As the third proposal British Pat. No. 1,024,336, whose corresponding Belgian Pat. No. 650,679 is introduced as prior art in the above described second proposal is noted.

This third proposal teaches the use, as the solid compound, of hydroxychlorides of divalent metals such as magnesium, calcium, cadmium, zinc, and ferrous iron. However, this proposal discloses that a catalyst comprising $TiCl_2$ as the transition metal component bonded to the surface of particles of a hydroxide of any of the above described divalent metals, for instance, $Ca(OH)_2$ is entirely inactive for the polymerization of propylene.

We had some doubts about the fact that the use of hydroxides of divalent metals is neglected or positively denied by these proposals and that the above described first and second proposals teach recognitions quite contradictory to each other with reference to the particle diameter of the solid and the quantity of the hydroxyl group present on the particle surface. Thus, we first studied the third proposal carefully, and found that a catalyst system comprising solid particles of calcium hydroxide is substantially inactive for the polymerization of ethylene as well as the polymerization of propylene as pointed out in the third proposal. For instance, when ethylene is polymerized with the use of a catalyst comprising a combination of a transition metal component of titanium tetrachloride chemically bonded to and supported on calcium hydroxide, with an organoaluminum compound or a dialkyl zinc compound, the results obtained are remarkably inferior when compared with the case where solid particles of calcium hydroxide are not used, and the polyethylene yield per unit quantity of the titanium component is extremely low. Thus, it was confirmed that the utilization of calcium hydroxide as a carrier does not give any improvement to the polymerization of ethylene but a reverse effect thereto.

A similar reverse effect was observed when the polymerization of ethylene was conducted in a similar catalyst system as mentioned above except that beryllium hydroxide particles were used as the solid particles.

Further, when the polymerization of propylene was carried out by employing a catalyst comprising magnesium hydroxide as the solid particles, the catalyst did not exhibit any significant polymerization activity and the resulting polymer was extremely inferior with respect to stereoregularity.

However, when ethylene was polymerized in a similar manner by employing a catalyst comprising magnesium hydroxide the solid particles, it was unexpectedly found that the advantages of the use of solid particles were completely attained and the catalyst produced polyethylene with an excellent polymerization activity.

The discovery that a catalyst utilizing solid particles of magnesium hydroxide exhibits an excellent activity for the polymerization of ethylene is quite surprising and unexpected in view of the following matters; the above described first proposal has no recognition of hydroxides and the above dsecribed second proposal positively denies the use of hydroxides; a catalyst which comprises solid particles of a hydroxide of calcium, i.e. the metal of Group IIIa-4 of the Periodic Table, and which is pointed out as being entirely inactive for the polymerization of propylene in the above described third proposal, does not exhibit any practically applicable activity for the polymerization of not only propylene but also ethylene; a catalyst which comprises solid particles of a hydroxide of beryllium, the metal of group IIa-2 of the Periodic Table, only exhibits a similar poor activity for the polymerization of ethylene; a catalyst comprising solid particles of a hydroxide of magnesium, the metal of Group IIa-3 of the Periodic Table does not exhibit any practically applicable activity for the polymerization of propylene; and either a catalyst comprising a combination of magnesium hydroxide with an organoaluminum compound or a dialkyl zinc, or a catalyst comprising a combination of magnesium hydroxide with a halide of titanium or vanadium does not have any activity for polymerizing ethylene.

Incidentally, the advantages expected from the use of solid particles are not obtained when a catalyst system prepared by merely simultaneously mixing three components, i.e. solid particles of magnesium hydroxide, a halogen compound of titanium or vanadium, and an organoaluminum compound or a dialkyl zinc is employed without a pretreatment of chemically bonding the halogen compound of titanium or vanadium to the solid particles of magnesium hydroxide to support the halogen compound thereon.

We tried to lucidate the reason why there are contradictory teachings in the prior arts, and found that the prior arts regard the essence of the phenomenon as being attributable to a sole factor such as the particle diameter of the carrier. With a view that the essence of the phenomenon should be seen from quite a different angle, we conducted research and arrived at the basic concept of this invention.

The overall activity of a catalyst supported by a carrier depends on both the capacity for supporting the catalyst component of the carrier and the catalytic activity of the supported component. From the above view point we made attempts to obtain catalysts capable of exhibiting far more excellent activity over the catalysts of the prior art, and found that an optimum condition for obtaining excellent catalysts exists, which condition belongs to a category remote form the teaching of any of the prior art. On the basis of this discovery we arrived at this invention.

More specifically, in the case of a catalyst supported by a carrier the polymer yield per unit quantity of the catalytic component is in proportion to the product of the amount of the transition metal supported and the activity of the supported tansition metal. However, not only does the amount supported but also the activity of the supported component varies considerably according to the specific surface area and average particle diameter of the carrier. Further, it is frequently seen that the specific surface area and average particle diameter optimum for the activity of the supported component are not in accord with those optimum for the amount supported. Accordingly, in order to obtain a maximum polymer yield which is in proportion to the product of the amount of the catalytic component supported and the activity thereof, it is necessary to adjust both of the specific surface area and average particle diameter in appropriate ranges.

More detailedly, although it has been conveniently established that the property most required for the carrier is a property of being capable of supporting the catalytic component as much as possible, which property depends on whether the surface area is great or not, and that a carrier provided with such property can improve the efficiency of the catalyst, our research proved, as is seen from the results shown in Table 2 hereinbelow described, that these conventionally established technical concepts do not hit the target in the art which this invention relates to.

In accordance with this invention it is not indispensable to merely increase the amount of the catalytic component support on a carrier but to adjust the relative surface area and average particle diameter of the carrier in specific ranges.

In each of Examples 5, 9, 11 and 12 where better overall results are obtained among examples whose results are shown in Table 2, the amount of the titanium component supported is not always great. This fact means that all of the titanium component supported does not equally pertain to promotion fo the polymerization, and it is suggested that in the titanium component there exists what should be called effective titanium.

The object of this invention is to develop a carrier capable of supporting such effective titanium as much as possible.

The basic concept of this invention will be described below.

As a result of research employing carriers having the specific surface area specified in the persent invention but being different in the average particle diameter, it has been confirmed that as the particle diameter becomes greater, (1) the amount of titanium supported decreases,
(2) the polyethylene yield per unit quantity of titanium supported increases gradually until the average particle diameter reaches $1.5\mu$, and the yield increases rapidly after the average particle diameter has exceeded such value, and
(3) the total yield of polyethylene in (proportion to the product of the amount of titanium supported and the yield per unit quantity of the titanium) increases rapidly until the average particle diameter reaches $4\mu$, exhibits a maximum value when the average particle diameter is in the range of from $4\mu$ to $30\mu$ and thereafter gradually decreases.

Accordingly, from the viewpoint of practical use a lower limit of the average particle diameter of the carrier exists in the vicinity of $1.5\mu$, and the practice of this invention is difficult when the average particle diameter of the carrier is less than $1\mu$.

On the other hand, as a result of research employing carriers having the average particle diameter specified in the present invention but being different in the relative surface area, it has been confirmed that as the relative surface area becomes greater, (1') the amount of titanium supported increases,
(2') the polyethylene yield per unit quantity of the titanium supported increase until the specific surface area reaches about 60 m.$^2$/g., and thereafter it decreases rapidly, and
(3') the total yield of polyethylene increases until the specific surface area reaches about 35 m.$^2$/g., exhibits a maximum value when the specific surface area is in the range of from 35 to 80 m.$^2$/g., and thereafter gradually decreases.

Accordingly, from the view point of practical use an upper limit of the specific surface area exists in the vicinity of 100 m.$^2$/g., and the practice of this invention is difficult when the specific surface area exceeds 120 m.$^2$/g.

As described above, in the carrier a lower limit of the average particle diameter and an upper limit of the specific surface area exists. Further, a lower limit of the specific surface area corresponding to the lower limit of the average particle diameter exists and an upper limit of the average particle diameter corresponding to the upper limit of the specific surface area exists.

In brief, we elucidated the origin of shortcomings of the prior art and arrived at the conclusion that in order to overcome these shortcomings drastically it is necessary to see the essence of the catalyst supported by a carrier in a quite different light, and finally succeeded in producing the novel carrier of this invention.

One of advantages of this invention is that the novel carrier of this invention can greatly improve the polymer yield per unit quantity of the titanium or vanadium compound catalyst. Further, since the amount of the catalyst to be incorporated in the resulting polymer is extremely reduced, the operation of removal of the catalyst may be omitted. This is another advantage of this invention.

In accordance with this invention, besides the above-mentioned advantages, other various advantages and improvements can be attained by employing as one catalyst component a combination of solid particles of magnesium having an average particle diameter in a specific range and a specific surface area in a specific range, with a transition metal compound chemically bonded to the solid particles of magnesium hydroxide.

Other advantages of this invention are as follows:

In the preparation of one catalyst component by the reaction of the particles with a transition metal compound, the removal and separation of the unreacted transition metal compound from the particles can be easily performed. In the slurry polymerisation polymers of high apparent density can be obtained, resulting in high space yields, and the discharge, filtering, drying and transportation of the resulting polymers can be easily conducted. Polymers having a broad molecular weight distribution, being excellent in processability and accordingly being very suitable for use in extrusion moulding in which good appearance is required can be obtained. Even when the operation of removing the catalyst is omitted and solid particles remain in the resulting polymer, since the solid particles per se do not contain any halogen, the amount of halogen remaining in the polymer is very small and therefore formation of rust on molds or the like can be prevented.

On the other hand, in the prior art of the above described first proposal, since the solid particles to be used are extremely finely divided, after the reaction of the particles with a transition metal compound, it is very difficult to remove the unreacted transition metal compound from the particles. Further, the resulting polymers have an apparent density as low as that of the products obtained by employing a two-component catalyst system free of such particles; therefore the space yield cannot be increased, and the process of the first proposal cannot escape from an industrial disadvantage of an inferior efficiency in the transportation and drying of the resulting polymers. In the art of the above described second proposal, the molecular weight distribution of the resulting polymers is comparatively narrow and therefore, the products are inferior in processability. Particularly, when they are subjected to extrusion molding a so called alligator skin phenomenon occurs, and the appearance of the resulting shaped articles becomes very poor, and the commercial availability of such articles is greatly reduced. In the art of the above described third proposal, the compound to be used so solid particles is not commercially available, and the preparation thereof is very troublesome. Further, since the compound to be used as solid particles per se contains halogen, if the operation of removing the catalyst is omitted, the resulting polymers contain a greater amount of halogen and formation of rust is observed on a shaping mold or the like. Still further, when such polymers are mixed with various additives, occurrence of discoloration or degration must be taken into consideration.

In accordance with this invention it is possible to overcome the above described shortcomings of the conventional arts.

Still further, while in the above described first proposal a transition metal compound in the state dissolved in a solvent is allowed to contact the solid particles, in accordance with this invention, as detailed hereinbelow, solid particles are immersed directly into a transition metal compound preferably free of other solvent, and therefore the polymer yield per unit quantity of titanium or vanadium is greatly improved over the art of the first proposal.

Accordingly, the object of this invention is to provide an improvement of the conventional process for the polymerization of ethylene employing a catalyst supported on a carrier composed of solid particles, wherein magnesium hydroxide is specifically selected among the hydroxides of the metals of Group II-$a$ of the Periodic Table, whose use is positively avoided in the prior arts, and solid particles of magnesium hydroxide are used as the solid particles of the carrier for the known ethylene-polymerization catalyst systems.

Other objects and advantages of this invention will be revealed hereinbelow.

By the term "average particle diameter" used in this invention it is indicated not only that the average value of diameters of particles is in the specified range of the average particle diameter but also that at least 80% by weight of particles have a diameter falling within such specified range. The value of "specific surface area" referred to in this invention is one measured by the nitrogen adsorption in accordance with BET method.

Ethylene polymerization catalysts have been known which are composed of a combination of a transition metal compound with an organoaluminum compound or a dialkyl zinc and have a carrier composed of solid particles different from those specified in this invention.

As the titanium or vanadium halogen compound to be chemically bonded onto the solid particles of magnesium hydroxide specified by the above described requirements (ii) and (iii) of this invention, titanium tetrachloride, titanium tetrabromide, vanadium tetrachloride, vanadium oxytrichloride, and titanium alkoxychlorides such as titanium di(n-butoxy)dichloride, titanium tri(i-propoxy) chloride and titanim ethoxytrichloride can be cited.

As the organometallic compound having an olefin polymerization activity which is used in combination with the above described titanium or vanadum compound supported on magnesium hydroxide, organoaluminum compounds of the formulas, $R_3Al$, $R_2AlX$, $RAlX_2$, $Ral(OR)X$ and $R_3Al_2X_3$, and dialkyl zinc compounds of the formula $R_2Zn$ can be cited. In the above formulas R stands for alkyl or aryl, and X denotes halogen. The specific examples of the organometallic compounds are trialkyl-aluminum such as triethylaluminum, tripropylaluminum and tributylaluminum; dialkylaluminum halides such as diethylaluminum chloride, diethylaluminum bromide, dibutylaluminum chloride and dibutylaluminum bromide; diethylaluminum ethoxide; diethylaluminum phenoxide; diethylaluminum hydride; dibutylaluminum hydride; ethylaluminum ethoxychloride; ethylaluminum sesquichloride; diethyl zinc and dibutyl zinc.

In this invention, the solid particles which carry the above described titanium or vanadium halogen compound chemically bonded thereto, are (i) particles of magnesium hydroxide having
(ii) an average particle diameter in the range of from 1 to 70$\mu$, preferably from 2 to 60$\mu$, especially preferably from 3 to 50$\mu$, most preferably from 4 to 30$\mu$, and
(iii) a specific surface area (as measured by the nitrogen adsorption method) in the range of from 20 to 100 m.$^2$/g., preferably 25 to 100 m.$^2$/g., especially preferably 35 to 80 m.$^2$/g.

The solid particles of magnesium hydroxide provided with the above described requirements (ii) and (iii) can be prepared by drying such magnesium hydroxide, optionally pulverizing it and screening it. If desired, before chemical supporting of the titanium or vanadium halogen compound, the particles of magnesium hydroxide may be subjected to a heat treatment at 100–1000° C., preferably 300–800° C. In this case, the heat treatment temperature is selected in the above range depending on the object of polymerization. When the temperature is outside the above range, particularly higher than the upper limits, the catalyst activity is apt to be reduced. Therefore, even in the above described range, a temperature as low as possible is preferred.

In case magnesium hydroxide having an average particle diameter greater than $60\mu$, particular greater than about $70\mu$, is used in this invention, even if the particles are provided with the above described specific surface area requirement (iii), the transportation of the catalyst slurry is difficult, which results in an extreme operational restriction, and the resulting polymers have very poor processability. Still further, shaped articles prepared from polymers obtained by utilizing carrier particles of too great an average diameter have been degraded properties and therefore, are extremely restricted in use. For instance, films shaped from such polymers cannot escape from occurrence of fish eyes, and filaments shaped from such polymers are not free of yarn breakages. On other hand, when the average particle diameter is less than $2\mu$, particularly less than about $1\mu$, it is very difficult to remove the unreacted transition metal compound from particles bonded chemically with the metal compound after the reaction of the transition metal compound with the particles. Therefore, the substantial washing time and frequency are increased and accordingly, the catalyst is frequently deactivated by water contained in a washing liquor. Further, the products obtained by utilizing carrier particles of such fine diameter are only polymers having a low apparent density, resulting in various operational disadvantages such as low space yield, difficult drying of the products and poor transportation efficiency. Moreover, polymerization activity per unit quantity of the carrier or the transition metal is frequently lowered, and further reproducibility of the polymerization reaction becomes very poor.

Accordingly, it is essential in this invention to use solid particles of magnesium hydroxide having an average of particle diameter in the range of from 1 to $70\mu$, preferably from 2 to $60\mu$, especially preferably from 3 to $50\mu$, most preferably from 4 to $30\mu$.

Solid particles of magnesium hydroxide meeting the specific surface requirement (iii) as well as the above described average particle diameter requirement (ii) are used in this invention. The use of particles having a specific surface area less than 25 m.²/g., particularly less than 20 m.²/g. invites a substantial lowering of the polymerization activity per unit quantity of the supported catalyst component, and the significance of using such solid particles is lost. When particles having a too great specific surface area, for instance, greater than about 100 m.²/g. are used, an unnecessarily greater amount of the transition metal compound is deposited on the particles during the preparation of the catalyst, and the existence of such excess of the transition metal compound rather lowers the polymerization activity per unit quantity of the transition metals. Therefore, it is not always advantageous to use particles having an extremely great specific surface area. The use of solid particles of magnesium hydroxide having a specific surface area in the range of preferably from 25 to 100 m.²/g., especially preferably 35 to 80 m.²/g., is recommended.

The titanium or vanadium halogen compound is chemically bonded to the surface of solid particles of magnesium hydroxide preferably by immersing the solid particles of magnesium hydroxide into the titanium or vanadium halogen compound generally at a temperature of 80 to 200° C. for 30 minutes to five hours, which conditions are not necessarily critical. Of course, the above treatment is performed in the substantial absence of oxygen and water, generally in an atmosphere of an inert gas.

After the above treatment, the unreacted titanium or vanadium halogen compound is removed by filtration or decantation. Thereafter, solid particles of magnesium hydroxide onto which the titanium or vanadium halogen compound has been chemically bonded are usually washed with a suitable inert solvent such as hexane, heptane and kerosene to remove the unsupported titanium or vanadium halogen compound therefrom.

When the so washed solid particles are used as the catalyst component, they are suspended in an inert solvent or formed into a solid powder by volatilizing the washing liquor in a dry inert gas stream or under reduced pressure. Although deposition of a titanium or vanadium compound not chemically bonded on the particles is not preferable, the deposition of a slight amount of such unreacted compound is permissible as long as the object of this invention is not hindered by the existence of such unreacted compound.

In this invention, one component of the catalyst is the so prepared solid particles of magnesium hydroxide carrying a titanium or vanadium catalytic component chemically bonded to the surface thereof, and the other component of the catalyst is the above described organoaluminum compound or dialkyl zinc.

With reference to the mixing ratio of both components of the catalyst, it is preferred that 0.5 to 300 mols of aluminum or zinc atom are used per mol of titanium or vanadium atom chemically bonded onto the surface of solid particles of magnesium hydroxide. The concentration used of the catalyst can be changed, but preferred concentrations are such that about 0.005 to 10 g., preferably 20 to 400 mg. of solid particles carrying the titanium or vanadium compound bonded thereto and 0.01 to 50 mmols, preferably 0.032 to 3 mmols of the organoaluminum or dialkyl zinc compound are contained in 1 liter of solvent.

The polymerization of ethylene with the use of the catalyst of this invention is conducted in a similar manner as the ethylene polymerization reaction using a Ziegler-type catalyst. In other words, the polymerization of this invention is carried out in the substantial absence of oxygen and water. A preferable solvent such as hexane, heptane and kerosene is used. The catalyst is added to such solvent, and the polymerization of ethylene is allowed to advance by feeding ethylene to the solvent containing the catalyst. The polymerization temperature is generally in the range of 20 to 200° C., preferably 60 to 180° C. The polymerization is generally performed at a pressure ranging from atmospheric pressure to an elevated pressure of 60 kg./cm.², but it is preferred to carry out the polymerization under an elevated pressure of 2 to 50 kg./cm.².

The catalyst system of the present invention may be applied to solution polymerization at elevated temperatures as well as slurry polymerization.

In the polymerization of ethylene with the use of the catalyst of this invention, it is possible to adjust the molecular weight to some extent by changing the polymerization conditions such as polymerization temperature and the mol ratio of the ctaalyst components, and the addition of hydrogen to the polymerization system is effective for attaining such purpose.

In addition to the above described advantages, the use of the catalyst system of this invention brings about the following advantages:

Since the amount of the titanium or vanadium compound used is so small per unit quantity of the resulting polyethylene, the treatment after the polymerization can be extremely simplified or in many cases, it is unnecessary. In other words, since the amount of the titanium or vanadium compound used in this invention is very small and the titanium or vanadium compound is very thinly deposited on the surface of the carrier, the deactivation of the titanium or vanadium compound can be performed with comparative ease. Further, the titanium or vanadium compound, even if it is deactivated deliberately with, for instance, alcohol, does not appreciably deteriorate the resulting polyethylene, since it is contained in the catalyst only in a very small amount. Still further, since the carrier to be used is free of halogen, even if it remains in the resulting polyethylene, it does not cause occurrence of rust on a mold or the like during the processing procedures, and it hardly discolors or degrades polyethylene shaped articles.

In the polymerization with the use of the catalyst of this invention, it is also possible to prepare copolymers by feeding propylene, butene or the like together with ethylene. However, in order to obtain a polymer of high crystallinity, it is necessary to have ethylene present in an amount of more than 90 mol percent of the feed. In the catalyst system of this invention, it is also possible to increase the yield and improve the apparent density of the product by adding to the polymerization system various additives generally used in the Ziegler-type polymerization, such as polysiloxanes and ethers.

EXAMPLE 1 and CONTROLS 1–3

Solid particles having an average particles diameter of $10\mu$ and a specific surface area of 50 m.$^2$/g. were prepared by pulverizing and screening commercially available magnesium hydroxide. These particles were dried in a vacuum dried at 80° C. for 12 hours. To 100 g. of the particles 100 cc. of titanium tetrachloride were fed, and the mixture was heated at 140° C. while stirring for 90 minutes. After having been sedimented at 120° C. by stopping stirring, the solid particles were isolated by means of decantation and sufficiently washed with pure hexane until chlorine was not detected in the washing liquor. Thereafter, the solid particles were dried under a dry nitrogen stream. The amounts of titanium and chlorine atoms chemically bonded to the so prepared solid particles were 21 mg. and 105 mg. per gram of the carrier, respectively.

An autoclave of 2 liter capacity was charged with 1 liter of kerosene as the solvent and its atmosphere was sufficiently replaced by nitrogen. Thereafter, 3 mmols of triethylaluminum and 200 mg. of the so prepared solid particles were charged in the autoclave, and its temperature was raised to 90° C. Then, hydrogen of 3.5 kg./cm.$^2$ and ethylene of 3.5 g./cm.$^2$ were fed to the system. Ethylene was continuously fed in such a manner that the total pressure would be maintained at 7 kg./cm.$^2$. After 2 hours polymerization, the solvent was separated, and immediately thereafter, the drying was performed without any specific treatment for deactivating the catalyst with methanol. As a result 300 g. of white polyethylene having an apparent density of 0.300 and a melt index of 4 were obtained.

The polyethylene yield per mg. of titanium was 71.4 g. The contents of titanium and chlorine in the polymer were only 13 p.p.m. and 30 p.p.m., respectively.

For comparison the results of Control 1 where the above procedures of Example 1 were repeated by employing solid particles of calcium hydroxide instead of those of magnesium hydroxide, Control 2 where Example 1 was repeated by employing beryllium hydroxide instead of magnesium hydroxide, and Control 5 where Example 1 was repeated without using any solid particle are shown in Table 1 below together with the results of Example 1.

TABLE 1

| | Solid particles | Yield of polyethylene (g.) | Polyethylene yield per mg. of titanium used (g.) |
|---|---|---|---|
| Example 1 | Mg(OH)$_2$ | 300 | 71.4 |
| Control: | | | |
| 1 | Ca(OH)$_2$ | 20 | 4.7 |
| 2 | Be(OH)$_2$ | 18 | 3.9 |
| 3 | | 21 | 5.0 |

EXAMPLES 2–14 AND CONTROLS 4–7

Various catalysts were prepared in a similar manner as in Example 1 by changing the average particle diameter and specific surface area of the magnesium hydroxide particles.

Each of these catalyst carriers was added in an amount of 200 mg. together with 3 mmols of triisobutyl aluminum to 1 liter of pure kerosene in a 2-liter autoclave. After the temperature was raised to 90° C., hydrogen of 1.2 kg./cm.$^2$ was fed to the system and ethylene was continuously added to the system for 2 hours in such a manner that the total pressure would be maintained at 5 kg./cm.$^2$. The results of the polymerization of each run are shown in Table 2 below.

TABLE 2

| | Average particle diameter ($\mu$) | Specific surface area (m.$^2$/g.) | Bonded titanium (mg./g. carrier) | Resulting polyethylene | | | |
|---|---|---|---|---|---|---|---|
| | | | | Yield (g.) | g. PE/ mg. Ti | Apparent density | Melt index |
| Control 4 | 0.5 | 60 | 58 | 86 | 7.4 | 0.101 | 0.17 |
| Example: | | | | | | | |
| 2 | 1.5 | 60 | 48 | 109 | 11.4 | 0.186 | 0.19 |
| 3 | 2 | 60 | 31 | 160 | 25.8 | 0.215 | 0.26 |
| 4 | 3 | 50 | 23 | 212 | 46.1 | 0.230 | 0.28 |
| 5 | 4 | 50 | 20 | 287 | 71.7 | 0.335 | 0.32 |
| 6 | 4 | 100 | 52 | 166 | 16.3 | 0.272 | 0.21 |
| Control 5 | 10 | 15 | 5 | 31 | 31.0 | 0.072 | 0.19 |
| Example: | | | | | | | |
| 7 | 10 | 25 | 8 | 94 | 58.8 | 0.258 | 0.27 |
| 8 | 10 | 60 | 18 | 310 | 86.2 | 0.351 | 0.32 |
| Control 6 | 10 | 120 | 89 | 137 | 7.8 | 0.174 | 0.28 |
| Example: | | | | | | | |
| 9 | 20 | 35 | 18 | 304 | 84.4 | 0.337 | 0.35 |
| 10 | 30 | 60 | 16 | 305 | 95.4 | 0.340 | 0.35 |
| 11 | 30 | 80 | 21 | 296 | 70.5 | 0.346 | 0.35 |
| 12 | 50 | 35 | 12 | 273 | 113.8 | 0.310 | 0.30 |
| 13 | 60 | 45 | 11 | 229 | 104.0 | 0.293 | 0.32 |
| 14 | 70 | 45 | 10 | 201 | 100.5 | 0.286 | 0.35 |
| Control 7 | 80 | 50 | 16 | 208 | 65.0 | 0.214 | 0.33 |

From the results shown in Table 2 above it is evident that the smaller the average particle diameter of magnesium hydroxide and the further from the optimum range the specific surface area thereof, the lower are both the apparent density and of yield of the product.

In the run (Control 4) where magnesium hydroxide of an average particle diameter of $0.5\mu$ and a specific surface area of 60 m.$^2$/g. was reacted with TiCl$_4$ in a similar manner as in Example 1, since the carrier particle diameter was small, it took a great amount of time for the particles to sink and after the completion of the reaction. Further, since the capacity occupied by the carrier was great, an amount of the liquid removed by decantation was so small that it took a time substantially twice as long as in Example 1 to wash the reaction product.

In the run (Control 5) where ethylene was polymerized with the use of the catalyst prepared in a same manner as in Example 1 by employing magnesium hydroxide having an average particle diameter of 10μ and a specific surface area of 15 m.²/g., which is below the lower limit of the specific surface area requirement of this invention, the catalyst exhibited only a very low polymerization activity. On the other hand, in the run (Control 6) where ethylene was polymerized with the use of the catalyst prepared in a similar manner as in Example 1 by employing magnesium hydroxide having an average particle diameter of 10μ and a specific surface area of 120 m.²/g., which is above the upper limit of the specific surface area requirement of this invention, the amount of the titanium compound bonded to the particles was too great and the polymerization activity per unit quantity of titanium was extremely low. Thus, it is evident that the catalyst carriers of these runs are not practically usable.

With reference to polymers prepared in Examples 5, 9, 11, 12, 13 and 14, and Control 7, where polymers of better apparent densities were obtained in better yields, processing tests were performed. Each of these runs was repeated in accordance with the same recipe in a scale of 500 times, and resulting polymers were pelletized, and molded into films and filaments. The qualities of the resulting films and filaments were examined.

(a) Pelletizing tests

Conditions:
 Extruder, mm. Φ _____ 65
 Screw rotation rate, r.p.m. _____ 60
 Cylinder temperature, °C. _____ 180
 Screen pack, meshes _____ 200

Results

In the case of the polymer obtained in Control 7 where the carrier having an average particle diameter of 80μ was used, the carrier clogged the screen pack, and after 4 kg. of the polymer had been pelletized over a period of 10 minutes, the extrusion pressure reached 400 kg./cm.2; therefore, the pelletizing could not be continued.

In the case of the polymer obtained in Example 14 where the carrier of an average particle diameter of 70μ was used, the extrusion pressure rose as the amount of the polymer extruded increased, and when the amount pelletized reached 80 kg., the extrusion pressure was as high as 350 kg./cm.² and there clogs were observed in the screen pack.

In the case of the polymers of Examples 5, 9, 11, 12 and 13 where the carriers having an average particle diameter of less than 60μ, after the extrusion pressure had reached 150 kg./cm.², no further rising of the pressure was observed, and the pelletizing could be conducted at the constant extrusion pressure.

(b) Filament (400 denier) spinning tests

Conditions:
 Extruder _____ 30 mm. Φ
 Die nozzle _____ 1 mm. Φ×6 holes.
 Spinning temperature _____ 260° C.
 Cooling tank temperature _____ 65° C.
 Feed roll rate _____ 20.9 m./min.
 Draw tank temperature _____ 100° C.
 Draw ratio _____ 10.5 times.
 Extrusion rate _____ 57 g./min.

Results

| Polymers | Example 13 | Examples 9, 11 and 12 |
|---|---|---|
| Frequency of draw breakage (times/hr.) | 3 | 0 |

In the case of the polymer obtained by employing the carrier having an average particle diameter of 60μ, during the filament spinning test draw breakage was brought about. Thus, the polymer is not a most suitable one for the preparation of filaments.

(c) Film shaping tests

Conditions:
 Extruder _____ 40 mm. Φ.
 Blow film die _____ 100 mm. Φ.
 Die-roll distance _____ 80 cm.
 Air-ring height _____ 5 cm.
 Cylinder temperature ___ 180–210° C.
 Die temperature _____ 200–210° C.
 Expansion ratio _____ 1.6 times.
 Product size _____ 250 mm. (width), 0.02 mm. (thickness).

Results

| | Example | | |
|---|---|---|---|
| Polymer | 9 | 11 | 12 |
| Fish eye (number/g. PE) | 4 | 22 | 140 |

When the polymer obtained by employing the carrier having an average particle diameter of 50μ was shaped into a film, fish eyes appeared in such a great number that the commercial availability of the product was quite low. Thus, the polymer is not suitable for the preparation of films.

Examples 15–20

Example 1 was repeated by varying the class and amount of the titanium or vanadium compound, the class and amount of the organoaluminum compound or dialkyl zinc, the partial pressure of hydrogen, the reaction temperature and the ethylene pressure. The results are shown in Table 3 below.

TABLE 3

| Example number | Halogen compound of titanium or vanadium | | Organoaluminum compound or dialkyl zinc | | Hydrogen partial pressure (kg./cm.2) | Ethylene partial pressure (kg./cm.2) | Reaction temp. (° C.) | Resulting polyethylene | | |
|---|---|---|---|---|---|---|---|---|---|---|
| | Class | Supported amount (mg./g. carrier) | Class | Amount used (mmol) | | | | Yield (percent) | Apparent density | Melt index |
| 15 | TiBr₄ | 20 | (C₂H₅)₂AlCl | 5 | 2 | 5 | 80 | 206 | 0.315 | 0.31 |
| 16 | (C₂H₅O)TiCl₃ | 18 | (C₂H₅)₂AlOC₂H₅ | 6 | 2 | 6 | 90 | 18 | 0.296 | 0.17 |
| 17 | (n-C₄H₉O)₂TiCl₂ | 21 | (i-C₄H₉)₂AlH | 3 | 3.5 | 3.5 | 90 | 287 | 0.333 | 2.8 |
| 18 | (i-C₃H₇O)₃TiCl | 23 | (C₂H₅)₃Al₂Cl₃ | 3 | 3.5 | 3.5 | 90 | 194 | 0.325 | 2.4 |
| 19 | VCl₄ | 212 | (i-C₄H₉)₃Al | 3 | 5 | 3.5 | 90 | 255 | 0.335 | 6.4 |
| 20 | VOCl₃ | 21 | (C₂H₅)₂Zn | 4 | 5 | 4 | 90 | 187 | 0.308 | 5.9 |

EXAMPLES 21 AND 22

The polymerization was conducted for 2 hours in a 2-liter autoclave containing 1 liter of kerosene by employing a catalyst system consisting of 200 mg. of the catalyst carrier prepared in Examples 1 and 3 mmols of triethyl aluminum, charging hydrogen into the autoclave until the pressure reached 3.5 kg./cm.², feeding a mixed gas of ethylene containing 1.5 mol percent of propylene or 0.8 mol percent of butene-1 at a temperature of 90° C. and maintaining the pressure inside the autoclave at 10 kg./cm.². The results are shown in Table 4.

| Example number: | Mixed gas | Yield (g.) | Apparent density | Per 1,000 carbons |
|---|---|---|---|---|
| 21 | Ethylene and propylene | 392 | 0.350 | 4 methyl groups. |
| 22 | Ethylene and butene-1 | 388 | 0.355 | 3 ethyl groups. |

EXAMPLE 23

Magnesium hydroxide (having an average particle diameter of $5\mu$ and a specific surface area of 64 m.$^2$/g.) prepared by dipping magnesium oxide into water of 95° C. and vacuum dried for 24 hours at the same temperature, was heated at 400° C. under nitrogen flow for 30 minutes.

The so heat treated magnesium hydroxide carrier was suspended in titanium tetrachloride, and stirred for 1 hour at 130° C. Then, the reaction product was filtered, washed with pure hexane until no chlorine was observed in the washing liquor, and then dried. (The above procedures were conducted under nitrogen atmosphere.)

The so prepared catalyst carrier supported 71 mg. of chemically bonded titanium, as converted to titanium atom, per gram of the carrier.

To a 3-liter autoclave containing 1 liter of hexane as polymerization solvent, 200 mg. of the above catalyst carrier and 3 mmols of triisobutyl aluminum were added, and thereafter, the temperature was raised to 90° C. After addition of hydrogen of 5 kg./cm.$^2$, ethylene gas was continuously fed into the autoclave in such a manner that the total pressure would be maintained at 10 kg./cm.$^2$. The polymerization was continued for 2 hours. Without any treatment for deactivating the catalyst with methanol or the like, the solvent was separated immediately after the polymerization was stopped, and the remaining product was directly dried. As a result, 318 g. of white polyethylene having a melt index of 9.0 were obtained. The polyethylene yield per mg. of titanium was 22.3 g.

EXAMPLE 24

Magnesium hydroxide (having an average particle diameter of $10\mu$ and a specific surface area of 61 m.$^2$/g.) was heated at 800° C. for 30 minutes. From the so treated magnesium hydroxide, a catalyst carrier supporting 31 mg. of chemically bonded titanium, as converted to titanium atom, per gram of the carrier was prepared in a similar manner as in Example 24.

Ethylene was polymerized at 80° C. for 2 hours in a similar manner as in Example 24 by employing 200 mg. of the above catalyst carrier component and 3 mmols of ethylaluminum sesquichloride to obtain 142 g. of white polyethylene having a melt index of 6.6. The polyethylene yield per mg. of titanium was 23.0 g.

What we claim is:

1. In a process for the homopolymerization of ethylene or copolymerization of ethylene and a different monoolefin copolymerizable with ethylene in an inert solvent in the presence of a catalyst comprising a titanium or vanadium halogen compound bonded onto the surface of inorganic solid particles, by reacting said titanium or vanadium halogen compound with said inorganic solid particles, and an organoaluminum compound or a dialkyl zinc, the improvement wherein said inorganic solid particles are particles of magnesium hydroxide prepared by subjecting magnesium hydroxide having an average particle diameter exceeding $1\mu$ but not greater than $70\mu$, and a specific surface area in the range of from 20 to 100 m.$^2$/g., to drying by heating at a temperature up to 1000° C.

2. The process of claim 1, wherein said particles of magnesium hydroxide have an average particle diameter in the range of from 2 to $60\mu$.

3. The process of claim 1, wherein said particles of magnesium hydroxide have an average particle diameter in the range of from 3 to $50\mu$.

4. The process of claim 1, wherein said particles of magnesium hydroxide have an average particle diameter in the range of from 4 to $30\mu$.

5. The process of claim 1 wherein said particles of magnesium hydroxide have a specific surface area in the range of from 25 to 100 m.$^2$/g.

6. The process of claim 1, wherein said particles of magnesium hydroxide have a specific surface area in the range of from 35 to 80 m.$^2$/g.

7. The process of claim 1, wherein the monoolefin copolymerized with ethylene is propylene.

8. The process of claim 1, wherein the monoolefin copolymerized with ethylene is butene.

9. The process of claim 1, wherein the titanium halogen compound is titanium tetrachloride.

10. The process of claim 1, wherein the titanium halogen compound is titanium tetrabromide.

11. The process of claim 1, wherein the vanadium halogen compound is vanadium tetrachloride.

12. The process of claim 1, wherein the vanadium halogen compound is vanadium oxytrichloride.

13. The process of claim 1, wherein the organoaluminum compound is a trialkyl aluminum compound.

14. The process of claim 13, wherein the trialkyl aluminum compound is triethylaluminum.

15. The process of claim 13, wherein the trialkyl aluminum compound is tributylaluminum compound.

16. The process of claim 1, wherein the dialkyl zinc is diethyl zinc.

17. In a process for the homopolymerization of ethylene or copolymerization of ethylene and a different monoolefin in an inert solvent in the presence of a catalyst comprising a titanium or vanadium halogen compound bonded onto the surface of inorganic solid particles, by reacting said titanium or vanadium halogen compound with said inorganic solid particles, and an organoaluminum compound or a dialkyl zinc, the improvement wherein said inorganic solid particles are particles of magnesium hydroxide prepared by subjecting magnesium hydroxide particles having an average particle diameter exceeding $1\mu$ but not greater than $70\mu$ and a specific surface area in the range of from 20 to 100 m.$^2$/g., to a heat treatment at 100 to 1000° C.

18. The process of claim 17, wherein said particles are particles of magnesium hydroxide prepared by subjecting magnesium hydroxide particles having an average particle diameter exceeding $1\mu$ but not greater than $70\mu$, and a specific surface area in the range of from 20 to 100 m.$^2$/g., to a heat treatment at 300 to 800° C.

References Cited

UNITED STATES PATENTS

| 3,324,101 | 6/1967 | Baker et al. | 260—94.9 DA |
| 3,513,150 | 5/1970 | Matsuura et al. | 260—94.9 DA |
| 3,166,542 | 1/1965 | Orzechowski et al. | 260—93.7 |
| 3,400,110 | 9/1968 | Dassese et al. | 260—88.2 |

OTHER REFERENCES

Anderson et al.: Trans. Faraday Soc., vol. 58, pp. 1993–2004 (1962).

Solvay, Netherlands patent application No. 6714024, April 1968, pp. 1–15. (corresponds to Great Britain Pat. 1,140,649).

JOSEPH L. SCHOFER, Primary Examiner

E. J. SMITH, Assistant Examiner

U.S. Cl. X.R.

252—429 C; 260—94.9 C, 94.9 DA